United States Patent
Cunningham et al.

(10) Patent No.: US 11,175,649 B2
(45) Date of Patent: Nov. 16, 2021

(54) COMMAND MONITOR

(71) Applicant: Massachusetts Institute of Technology, Cambridge, MA (US)

(72) Inventors: Robert Cunningham, Lexington, MA (US); Benjamin Kaiser, Cambridge, MA (US); Margaret Boning, Cambridge, MA (US); Jeffrey Brandon, Cambridge, MA (US); Alice Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/026,266

(22) Filed: Jul. 3, 2018

(65) Prior Publication Data
US 2021/0318670 A1    Oct. 14, 2021

(51) Int. Cl.
| | |
|---|---|
| *G05B 19/418* | (2006.01) |
| *H04L 9/32* | (2006.01) |
| *H04L 9/08* | (2006.01) |
| *H04B 7/185* | (2006.01) |
| *H04B 7/155* | (2006.01) |
| *G01S 19/02* | (2010.01) |

(Continued)

(52) U.S. Cl.
CPC . *G05B 19/41835* (2013.01); *G05B 19/41855* (2013.01); *G05B 19/41885* (2013.01); *H04B 7/155* (2013.01); *H04B 7/185* (2013.01); *H04L 9/0825* (2013.01); *H04L 9/3273* (2013.01); *B64G 1/10* (2013.01); *B64G 1/24* (2013.01); *G01S 19/02* (2013.01); *G05B 2219/25274* (2013.01)

(58) Field of Classification Search
None
See application file for complete search history.

(56) References Cited

U.S. PATENT DOCUMENTS

| | | | | |
|---|---|---|---|---|
| 6,052,588 A | * | 4/2000 | Mo | H04B 7/18519 455/430 |
| 6,684,182 B1 | * | 1/2004 | Gold | G09B 9/52 703/8 |

(Continued)

OTHER PUBLICATIONS

Anderson, J.P. Computer security technology planning study. Technical Report ESD-TR-73-51, Air Force Electronic Systems Division, Hanscom AFB, Bedford, MA, Oct. 1972, 46 pages.

*Primary Examiner* — Bob A Phunkulh
(74) *Attorney, Agent, or Firm* — Occhiuti & Rohlicek LLP

(57) ABSTRACT

A method for mediating an interaction between a control station and a remote system includes maintaining, at a command monitor, data characterizing an operation of the remote system in response to execution of commands at the remote system, receiving, at the command monitor, state information from the remote system, updating the data characterizing the operation of the remote system based on the received state information, receiving, at the command monitor, one or more commands sent from the control station, determining a predicted set of one or more outcomes that would result from execution of the one or more commands at the remote system based at least in part on the data characterizing the operation of the remote system, and preventing issuance of at least one command of the one or more commands at the remote system based on the predicted set of one or more outcomes.

27 Claims, 6 Drawing Sheets

(51) Int. Cl.
*B64G 1/24* (2006.01)
*B64G 1/10* (2006.01)

(56) References Cited

U.S. PATENT DOCUMENTS

| | | | | |
|---:|---|---:|---|---|
| 7,925,167 | B1* | 4/2011 | Kozubal | H04B 10/118 |
| | | | | 398/125 |
| 9,651,946 | B1* | 5/2017 | Rubel | G05D 1/0027 |
| 10,384,809 | B2* | 8/2019 | Kang | B64G 1/24 |
| 2003/0017827 | A1* | 1/2003 | Ciaburro | H04B 7/18519 |
| | | | | 455/427 |
| 2007/0129922 | A1* | 6/2007 | Lee | B64G 1/244 |
| | | | | 703/13 |
| 2008/0092180 | A1* | 4/2008 | Kim | H04B 7/18519 |
| | | | | 725/63 |
| 2008/0313488 | A1* | 12/2008 | Jeong | H04B 7/18519 |
| | | | | 714/2 |
| 2009/0018780 | A1* | 1/2009 | Sookhu | G06Q 10/00 |
| | | | | 702/24 |
| 2009/0289840 | A1* | 11/2009 | Trautenberg | G01S 19/08 |
| | | | | 342/357.31 |
| 2009/0289842 | A1* | 11/2009 | Trautenberg | G01S 19/08 |
| | | | | 342/357.27 |
| 2011/0285583 | A1* | 11/2011 | Huang | G01S 19/40 |
| | | | | 342/357.23 |
| 2012/0139780 | A1* | 6/2012 | Wang | H04B 7/18519 |
| | | | | 342/354 |
| 2016/0142982 | A1* | 5/2016 | Kim | H04W 52/283 |
| | | | | 370/311 |
| 2017/0174367 | A1* | 6/2017 | Kang | B64G 1/10 |
| 2018/0103036 | A1* | 4/2018 | Fox | H04W 12/0609 |
| 2018/0134419 | A1* | 5/2018 | Zhou | B64G 1/244 |
| 2018/0314775 | A1* | 11/2018 | Lee | G01S 19/23 |
| 2020/0024001 | A1* | 1/2020 | Nishiyama | B64G 1/242 |

* cited by examiner

COMMAND MONITOR

STATEMENT AS TO FEDERALLY SPONSORED RESEARCH

This invention was made with Government support under Grant No. FA8702-15-D-0001 awarded by the U.S. Air Force. The Government has certain rights in the invention.

BACKGROUND

This invention relates to a command monitor.

A cyber-physical system is a system that integrates physical, software, and networking components. Some cyber-physical systems are controlled by one or more control stations which issue commands to the cyber-physical system over a communication link. Commands that are received by a cyber-physical system are parsed and executed by the system, where execution of at least some of the commands affects a change in a physical component of the system. One convenient example of a cyber-physical system is a satellite. A control station on earth issues commands to the satellite, which receives and executes the commands. For example, the control station on Earth may issue a command to the satellite to reposition its solar panels to face the sun while keeping a camera mounted to the satellite pointed at a particular region of interest on Earth and keeping a radio antenna mounted to the satellite pointed at a control station on Earth.

SUMMARY

In certain scenarios, malicious or otherwise undesirable commands that compromise or disable a cyber-physical system can be issued by a bad actor or even accidentally by an authorized operator. The result of issuance of those malicious or otherwise undesirable commands can be particularly damaging to cyber-physical systems because they are susceptible to being disabled due to their inclusion of physical components. For example, issuing a series of commands that would completely drain a battery of a satellite would disable the satellite, resulting in downtime and possible loss of the satellite.

Aspects described herein address the above-described problem by including a command monitor on a communication path between a control station and a cyber-physical system. Among other features, the command monitor includes a mechanism for validating that remote commands to such systems obey an explicit command policy. By forcing commands to obey the explicit command policy, execution of malicious, inadvertently dangerous, or otherwise undesirable commands is prevented.

In some examples, validation of the remote commands includes simulation of the effect of the commands using a model of the cyber-physical system.

In a general aspect, a method for mediating an interaction between a control station and a remote system using a command monitor located on a communication path between the control station and the remote system includes maintaining, at the command monitor, data characterizing an operation of the remote system in response to execution of one or more commands at the remote system, receiving, at the command monitor, state information from the remote system, updating the data characterizing the operation of the remote system based on the received state information, receiving, at the command monitor, one or more commands sent from the control station, determining a predicted set of one or more outcomes that would result from execution of the one or more commands at the remote system based at least in part on the data characterizing the operation of the remote system, and preventing issuance of at least one command of the one or more commands at the remote system based on the predicted set of one or more outcomes.

Aspects may include one or more of the following features.

Maintaining the data characterizing an operation of the remote system may include maintaining state information for the remote system and maintaining an operational model of the remote system. The method may include determining the operational model of the remote system, including modeling a physical and logical state of the remote system. The operational model of the remote system may include a physical model of the remote system. Receiving the state information from the remote system may include receiving one or more state variables from the remote system, and updating the data characterizing the operation of the remote system includes updating the state information of the data characterizing an operation of the remote system using the received state information.

Determining the predicted set of one or more outcomes may include simulating operation of the remote system executing the one or more commands using the operational model of the remote system and the state information for the remote system. Preventing issuance of the at least one command of the one or more commands may include determining that at least some of the predicted set of one or more outcomes violates a permitted operating state of the remote system. The command monitor may be implemented on a computing device separate from the control station and the remote system. The command monitor may be implemented at the remote system. The command monitor may be implemented at the control station.

The method may include receiving, at the command monitor, one or more attributes associated with the control station from the control station, wherein preventing issuance of at least one command of the one or more commands at the remote system is further based on the one or more attributes associated with the control station. Preventing issuance of at least one command of the one or more commands at the remote system may include determining that the at least one command would cause the remote system to enter a prohibited state.

Preventing issuance of at least one command of the one or more commands at the remote system may include applying a set of one or more rules to the one or more attributes and determining, based on the applying, to prevent issuance of the one or more commands at the remote system. The method may include receiving second state information from the control station. Determining the predicted set of one or more outcomes that would result from execution of the one or more commands at the remote system may be further based on the second state information.

The remote system may include a satellite. The remote system may include an unmanned vehicle. The remote system may include an industrial control system. The state information may include one or more of a battery level, a fuel level, a position, an orientation, information characterizing a motion of the remote system, and a physical configuration of the remote system including a configuration of a camera, a configuration of a power source, or a configuration of telemetry hardware, a bearing of the remote system, a heading of the remote system, a delivery status of a package, a power output of the remote system, environmental information, temperature information, humidity information, wind speed information, road condition information, weather information, photographic information, and video information.

The method may include receiving, at the command monitor, second state information characterizing a state of the remote system, the second state information obtained from a sensor independent from the remote system.

In another general aspect, a system for mediating an interaction between a control station and a remote system includes a command monitor located on a communication path between the control station and the remote system. The command monitor includes a first input for receiving state information from the remote system, a second input for receiving one or more commands sent from the control station, a state predictor including data characterizing an operation of the remote system in response to execution of one or more commands at the remote system, the state predictor configured to determine a predicted set of one or more outcomes that would result from execution of the one or more commands at the remote system based at least in part on the data characterizing the operation of the remote system, a command filter for processing the one or more commands sent from the control station according to the predicted set of one or more outcomes determined by the state predictor, the processing including preventing issuance of at least one command of the one or more commands at the remote system based on the predicted set of one or more outcomes.

The method may include mutually authenticating two or more of the command monitor, the control station, and the remote system. The mutual authenticating may include using one or more of pre-shared keys, a public key infrastructure, and quantum key distribution. The method may include mutually authenticating one or more users at one or more of the command monitor, the control station, and the remote system. The mutual authenticating may include using one or more of pre-shared keys, a public key infrastructure, and quantum key distribution.

Aspects may have one or more of the following advantages.

Among other advantages, a command monitor authenticates commands and prevents commands that would put the system in a faulty state from executing.

Advantageously, the command monitor can perform simple authentication using cryptographic methods such as hash-based message authentication code (HMAC) or digital signatures to ensure that commands are coming from authenticated control terminals. The command monitor can also use much finer-grained authorization techniques based on additional dynamic attributes.

The command monitor can enforce arbitrary and flexible policies, limited only by available attribute sources.

The command monitor facilitates fault detection and recovery. For example, some conventional techniques use watchdog timers to prevent execution of commands that would result in a system being configured into a faulty state. A watchdog timer is a process that runs on an embedded system to prevent processes from locking and system resources from being depleted. Watchdog timers typically operate at a low architectural level, permitting a high degree of introspection into system internals but sacrificing flexibility and configurability. They do not filter malicious or otherwise undesirable commands but instead focus on detecting and recovering from unplanned actions or faulty hardware. The command monitor, on the other hand catches commands that would put the system in a bad state before they are ever sent to the system. It is easy to update a command monitor to enforce new policy rules because it uses a standard policy expression model and can be deployed on the ground (in contrast to watchdog timers, which are part of the embedded system's software and thus rigid and difficult to alter).

Other features and advantages of the invention are apparent from the following description, and from the claims.

DESCRIPTION

Figure 1:
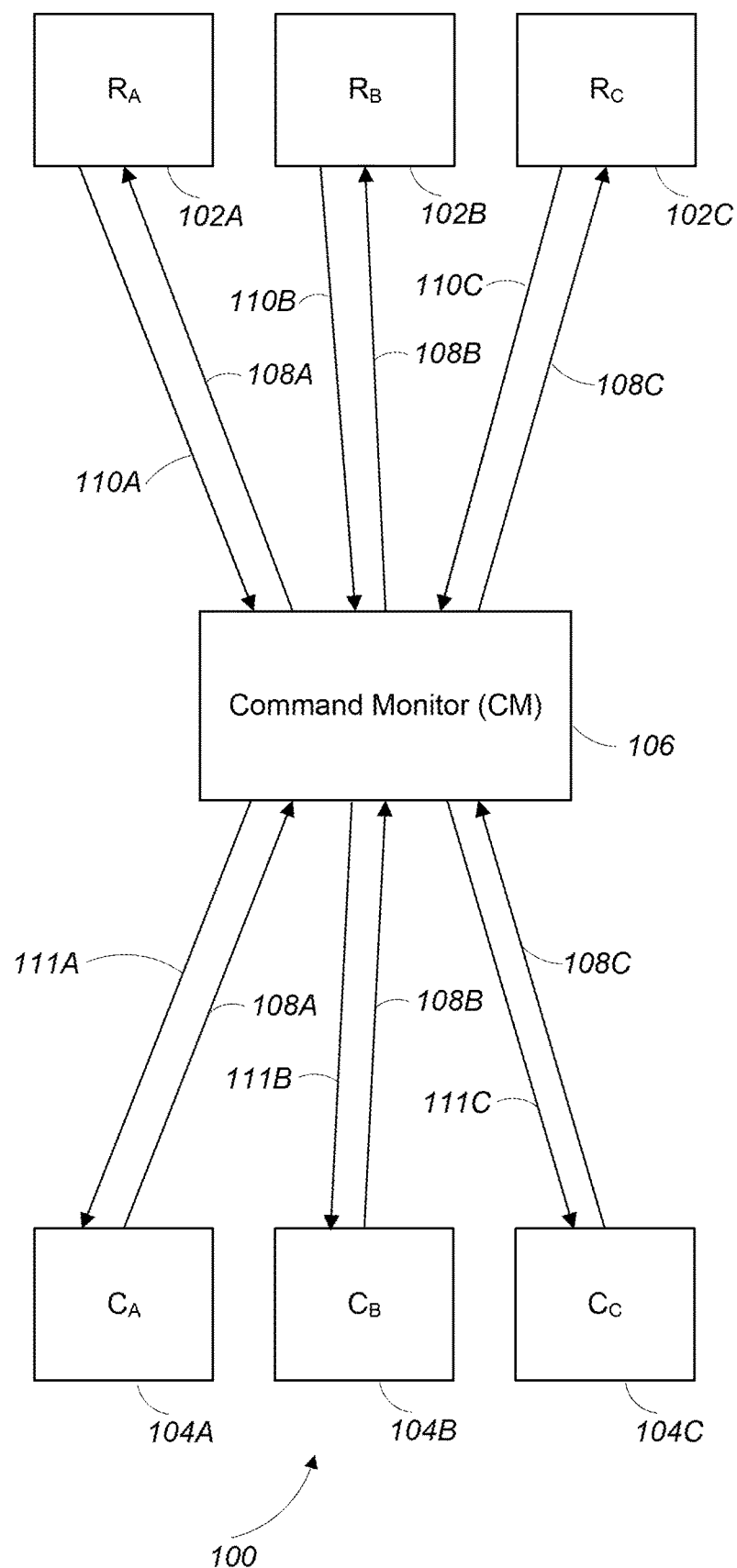
FIG. 1 is a first configuration of a communication and control system including a command monitor.

Referring to FIG. 1, a communication and control system 100 facilitates the control of one or more remote cyber-physical systems 102 (e.g., satellites) by one or more control stations 104 (e.g., ground based satellite control stations). Very generally, the control stations 104 issue commands, which traverse one or more communication paths 108 (e.g., radio telemetry paths) extending between the control stations 104 and the remote cyber-physical systems 102 and eventually arrive at the one or more remote cyber-physical systems 102.

A command monitor (CM) 106 is located at some point along the one or more communication paths 108, such that any command issued by a control station 104 is received (e.g., received, intercepted, or proxied) and mediated by the command monitor 106 before being issued and executed at one or more remote cyber-physical systems 102. The command monitor 106 receives information related to a state of the remote cyber-physical systems 102 (e.g., a position, orientation, or resource levels associated with the system) as well as information related to a state of the control stations 104 (e.g., an authentication state of a control station). In some examples, the state information is received periodically when it becomes available to the control station 104.

As is described in greater detail below, the command monitor 106 includes a state dependent logical filter that processes the received commands according to the received state information to ensure that execution of those commands at the remote systems 104 will not result in the remote systems 102 being configured in a prohibited, undesirable, and/or faulty state. In some examples, the state dependent logical filter does so by evaluating attributes from the received state information according to access control rules of a command policy.

In some examples, the command monitor 106 provides feedback to the control stations 104 including information indicating whether commands issued by the control stations 104 were issued to the remote cyber-physical systems 102 and information related to an updated state of the remote cyber-physical systems 102.

1 Many-to-Many Communication and Control System

The communication and control system 100 is implemented as a "many-to-many" communication and control system, where a number of control stations 104 are configured to control corresponding remote cyber-physical systems 102. In particular, a first control station, $C_A$ 104A is configured to control a first remote cyber-physical system, $R_A$ 102A by issuing commands to the first remote cyber-physical system, $R_A$ 102A over a first communication link 108A. A second control station, $C_B$ 104B is configured to control a second remote cyber-physical system, $R_B$ 102B by issuing commands to the second remote cyber-physical system, $R_B$ 102B over a second communication link 108B. A third control station, $C_C$ 104C is configured to control a third remote cyber-physical system, $R_C$ 102C by issuing commands to the third remote cyber-physical system, $R_C$ 102C over a third communication link 108C. It is noted that, in certain configurations any one of the control stations 104 can control any one of the remote cyber-physical systems 102.

A command monitor 106 is implemented as a separate entity (e.g., a network node serving as a logical network endpoint) disposed along the first communication link 108A, the second communication link 108B, and the third communication link 108C. The command monitor 106 receives state information from both the remote cyber-physical systems 102 and from the control stations 104. The state information received from the remote cyber-physical systems 102 is received over first, second and third state feedback links 110A, 110B, and 110C and indicates, among other information, a current state of the remote cyber-physical systems 102. The state information received from the control stations 104 is received over the communication links 108 and indicates, among other information, authentication information related to the control stations themselves as well as authentication information related to one or more operators associated with the control stations.

The command monitor 106 receives and mediates commands (e.g., all commands) that are issued over the communication links 108 by the control stations 104 and processes the received commands according to the current state of the remote cyber-physical systems 102 and the state information from the control stations 104 to determine whether, if executed, the received commands would result in one or more of the remote cyber-physical systems 102 being configured in a prohibited, undesirable, and/or faulty state. If a received command destined for one or more of the remote cyber-physical systems 102 would not result in those systems being configured in such a state, then the command monitor 106 issues the command to the one or more remote cyber-physical systems 102, where the command is executed. Otherwise, if the command monitor 106 determines that the received command, if executed, would result in the one or more remote cyber-physical systems 102 being configured in such a state, the command monitor 106 does not issue the received command to the one or more remote cyber-physical systems 102, thereby preventing the received command from executing and configuring the remote cyber-physical systems 102 into a prohibited, undesirable, and/or faulty state.

In some examples, command monitor 106 provides feedback to the control stations 104 over control feedback links 111A, 111B, and 111C. The feedback provided to the control stations 104 includes but is not limited to information indicating whether commands issued by the control stations 104 were issued to the remote cyber-physical systems 102 and information related to the updated state of the remote cyber-physical systems 102.

Figure 2:
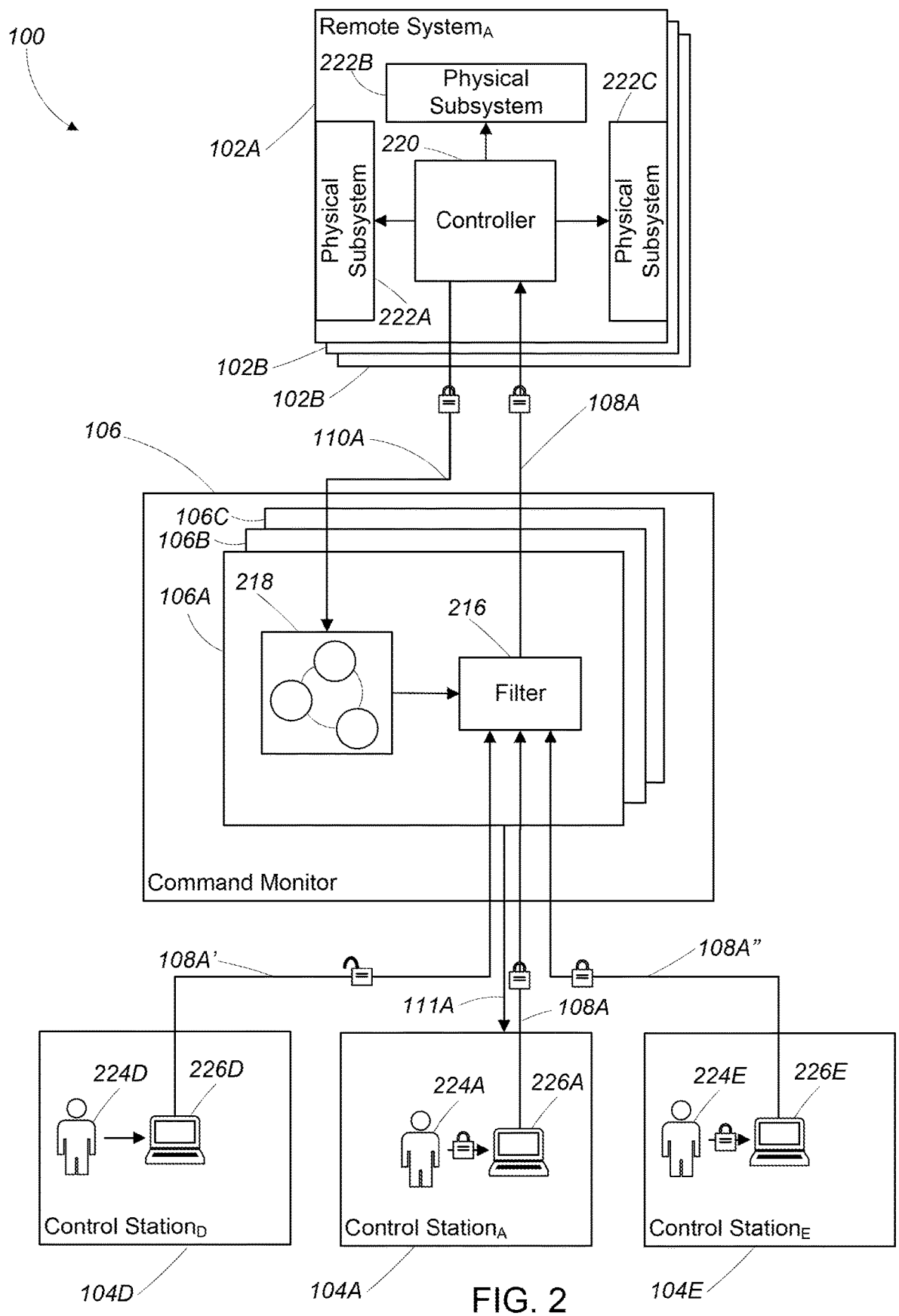
FIG. 2 is a detailed view of the communication and control system of FIG. 1.

Referring to FIG. 2, the communication and control system 100 of FIG. 1 is rearranged to illustrate control of the first remote cyber-physical system, $R_A$ 102A by the first control station, $C_A$ 104A. While FIG. 2 and the following description focus on the interactions between the first control station, $C_A$ 104A, the command monitor 106, and the first remote cyber-physical system, $R_A$ 102A, it should be understood that all of the control stations 104 and remote cyber-physical systems 102 are configured to interact with one another and with the command monitor in a similar manner.

The first control station, $C_A$ 104A includes a first operator 224A interacting with a first control terminal 226A to formulate and issue commands for controlling the first remote cyber-physical system, $R_A$ 102A. In this example, the first operator 224A is an authorized user of the first control terminal 226A and the first control terminal 226A has established (or is able to establish) a trust relationship with the command monitor 106.

The first remote cyber-physical system, $R_A$ 102A includes a controller 220 and a number of physical subsystems 222 including a first physical subsystem 222A, a second physical subsystem 222B, and a third physical subsystem 222C. Very generally, the controller receives commands from the command monitor 106 and executes the commands, at least some of which would affect a change in one or more of the physical subsystems 222 when executed by the physical subsystem. The controller 220 provides state feedback to the command monitor 106 over the state feedback link 110A to inform the command monitor 106 of the current state of the first remote cyber-physical system, $R_A$ 102A, including a current state of the physical subsystems 222 of the first remote cyber-physical system, $R_A$ 102A.

In some examples, the command monitor 106 includes a separate command sub-monitor 106A-C for each of the remote cyber-physical systems 102 that it monitors. For example, the command monitor 106 in FIG. 2 includes a first command sub-monitor 106A associated with the first remote cyber-physical system, $R_A$ 102A, a second command sub-monitor 106B associated with the second remote cyber-physical system, $R_B$ 102B, and a third command sub-monitor 106C associated with the third remote cyber-physical system, $R_C$ 102C. In other examples, a single command monitor 106 (with a single command sub-monitor) is used to monitor commands for multiple or all of the remote cyber-physical systems 102.

Each command sub-monitor 106 includes a state predictor 218 (e.g., a state machine and/or a functional, physical, or simulation model of the remote cyber-physical system, sometimes referred to as a ground-side model) and a command filter 216. Focusing on the first command sub-monitor 106A, the state predictor 218 receives and maintains the updated state of the first remote cyber-physical system, $R_A$ 102A from the controller 220 of the first remote cyber-physical system, $R_A$ 102A. With the updated state reflected in the state predictor 218, the state predictor 218 is configured to predict a state of the first remote cyber-physical system, $R_A$ 102A that would result from executing one or more commands at the first remote cyber-physical system, $R_A$ 102A.

The command filter 216 of the first command sub-monitor 106A is configured to receive commands directed to the first remote cyber-physical system, $R_A$ 102A and to determine whether to pass the received commands to the first remote cyber-physical system, $R_A$ 102A based, at least in part, on a predicted state of the first remote cyber-physical system, $R_A$ 102A that would result from executing the received commands at the first remote cyber-physical system, $R_A$ 102A. For example, when the command filter 216 receives one or more commands directed to the first remote cyber-physical system, $R_A$ 102A, it causes the state predictor 218 to determine a predicted state that would result from executing the one or more commands at the first remote cyber-physical system, $R_A$ 102A. The command filter 216 then filters the commands according to a command policy to determine whether the one or more commands are passed to the first remote cyber-physical system, $R_A$ 102A.

In some examples, the command policy is expressed using an access control model (e.g., the Attribute-Based Access Control (ABAC) model). The access control model includes access control rules that can be applied to state data (including system attributes) associated with one or both of the first remote cyber-physical system, $R_A$ 102A and the first control station, $C_A$ 104A. In some examples, the access control rules are also applied to attribute data associated with one or more human operators (e.g., an authentication status of an operator, system permissions, and other identity information).

1.1 Successful Control of the Remote Cyber-Physical System

In successful control of the first remote cyber-physical system, $R_A$ 102A by the first control station, $C_A$ 104A, the first operator 224A is properly logged in to the first control terminal 226A at the first control station, $C_A$ 104A and operates the first control terminal 226A to formulate a command for issuance to the first remote cyber-physical system, $R_A$ 102A. The first control terminal 226A has properly established a trust relationship with the command monitor 106 (shown as a padlock on the first communication link 108A) and the command is sent from the first control station, $C_A$ 104A to the command monitor 106 over the first communication link 108A.

The command monitor 106 receives the command and processes the command using the first sub-command monitor 106A. The first sub-command monitor 106A provides the command to the state predictor 218, which has previously received updated state information from both the first remote cyber-physical system, $R_A$ 102A and the first control station, $C_A$ 104A. The state predictor 218 processes the command according to the state information from the first remote cyber-physical system, $R_A$ 102A to determine a predicted state of the first remote cyber-physical system, $R_A$ 102A that would result from execution of the command by the first remote cyber-physical system, $R_A$ 102A. The predicted state is provided to the command filter 216 which evaluates the predicted state according to one or more control rules to determine whether the predicted state is prohibited, undesirable, and/or faulty. In this successful example, the command filter 216 determines that the predicted state is not prohibited, undesirable, and/or faulty and therefore forwards the command to the first remote cyber-physical system, $R_A$ 102A via the first communication link 108A. In some examples, the command monitor 106 establishes a trust relationship with the remote cyber-physical systems 104 (shown as a padlock on the first communication link 108A).

In one simple illustrative example of successful control of the first remote cyber-physical system, $R_A$ 102A, the first remote cyber-physical system, $R_A$ 102A is an imaging satellite orbiting Earth and collecting images. The command monitor 106 receives state information including system attributes from the satellite as well as state information from the first control station, $C_A$ 104A indicating the that the control station is authorized. The state information indicates that the satellite's radio antenna (the first physical subsystem 222A) is aimed at a particular point on Earth, its solar panels (the second physical subsystem 222B) are oriented to face the Sun, and its camera (the third physical subsystem 222C) is pointed toward first point of interest on Earth.

When the command monitor receives a command from the authorized first control station, $C_A$ 104A to rotate the satellite such that its camera is aimed at a second, different point of interest on Earth, the command monitor uses the state received from the satellite to predict a state of the satellite that would result from executing the command including predicting an updated set of system attributes. The updated set of system attributes indicates that rotating the satellite would result in the solar panels still being oriented to face the Sun, with the radio still pointing at the particular point on Earth, and the camera being pointed at the second point of interest on Earth, which is defined as an allowed (i.e., not prohibited, undesirable, and/or faulty) state by the command monitor. Based on the determination that executing the command would result in the satellite being configured in an allowed state, the command monitor issues the command to the satellite, where it executes. The command monitor provides feedback to the control station indicating that the command was issued to the satellite.

1.2 Unsuccessful Control of the Remote Cyber-Physical System

In one example of unsuccessful control of the first remote cyber-physical system, $R_A$ 102A, the command filter 216 determines that the predicted state is prohibited, undesirable, and/or faulty and therefore does not forward the command to the first remote cyber-physical system, $R_A$ 102A.

For example, assume again that the first remote cyber-physical system, $R_A$ 102A is an imaging satellite orbiting Earth and collecting images, as described above. The command monitor 106 receives state information including system attributes from the satellite as well as state information from the first control station, $C_A$ 104A indicating the that the control station is authorized. The state information indicates that the satellite's radio antenna (the first physical subsystem 222A) is aimed at a particular point on Earth, its solar panels (the second physical subsystem 222B) are oriented to face the Sun, and its camera (the third physical subsystem 222C) is pointed toward first point of interest on Earth.

When the command monitor receives a command from the first authorized control station, $C_A$ 104A to rotate the satellite such that its camera is aimed at a different point of interest on Earth, it uses the state information received from the satellite to predict a state of the satellite that would result from executing the command including predicting an updated set of system attributes. The updated set of system attributes indicates that rotating the satellite would result in the solar panels no longer being oriented to face the sun and the radio antenna no longer pointing at the particular point on Earth, which is defined as a prohibited state by the command policy enforced by the command monitor. Based on the determination that executing the command would result in the satellite being configured in a prohibited state, command monitor prevents issuance of the command to the satellite. The command monitor provides feedback to the control station indicating that the command was not issued to the satellite.

FIG. 2 also includes a fourth control station, CD 104D, and a fifth control station, CE 104E that are attempting to control the first remote cyber-physical system, $R_A$ 102A over communication links 108A' and 108A", respectively.

The fourth control station, CD 104D is not authorized (shown as an unlocked padlock on the communication link 108A) to control any remote cyber-physical systems 102 either because its operator 224D is not authorized to use its terminal 226D or the control station, CD 104D is unable to establish a trust relationship with the command monitor 106. The command monitor 106 therefore does not accept or forward any commands from the fourth control station, CD 104D.

The fifth control station, CE 104E has a malicious operator 224E who has somehow managed to establish a trusted connection with the command monitor 106. The malicious operator 224E may attempt to issue commands to place the first remote cyber-physical system into a prohibited, undesirable, and/or faulty state. But, the commands issued by malicious operator 224E will only be forwarded to the first remote cyber-physical system, $R_A$ 102A by the command monitor 106 if the command monitor 106 determines that they will not place the system into a prohibited, undesirable, and/or faulty state. So, the malicious operator 224E will fail to place the first remote cyber-physical system, $R_A$ 102A into a prohibited, undesirable, and/or faulty state.

For example, the malicious operator 224E could issue a number of commands to completely deplete the battery of a satellite. But the command monitor 106 would receive those commands, determine that they would cause the satellite to enter a faulty state, and then prevent issuance of those commands to the satellite.

2 Many-to-One Communication and Control System

Figure 3:
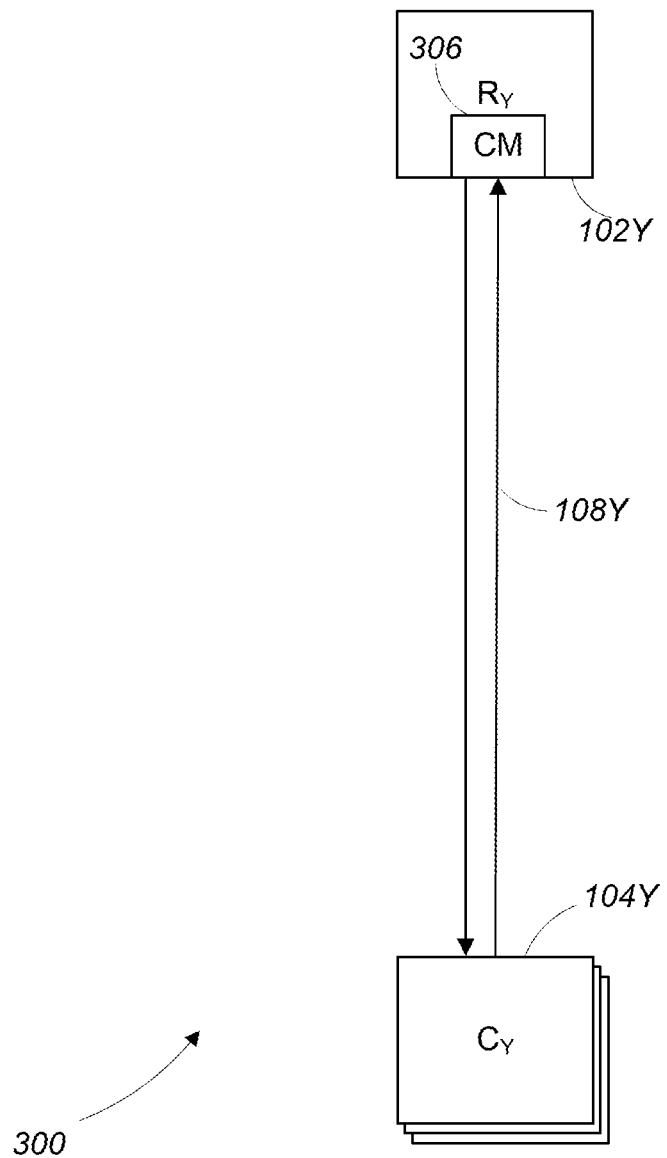
FIG. 3 is a second configuration of a communication and control system including a command monitor.

Referring to FIG. 3, a second communication and control system 300 is configured as a "many-to-one" system, where a number of control stations, collectively referred to as $C_Y$ 104Y, all issue commands to a single remote cyber-physical system, $R_Y$ 102Y. The control stations, $C_Y$ 104Y issue commands to the remote cyber-physical system, $R_Y$ 102Y over one or more communication links 108Y.

A command monitor 306 is implemented at one end of the one or more communication links 108Y and on the remote cyber-physical system, $R_Y$ 120Y. The command monitor 306 receives and mediates commands (e.g., all commands) that are issued over the one or more communication links 108Y by the one or more control stations, $C_Y$ 104Y. Because the command monitor 306 is implemented on the remote cyber-physical system, $R_Y$ 120Y, the command monitor 306 receives feedback directly from the remote cyber-physical system, $R_Y$ 102Y indicating, among other information, a current state of the remote cyber-physical system, $R_Y$ 102Y.

The command monitor 306 processes the received commands according to the current state of the remote cyber-physical system, $R_Y$ 102Y to determine whether, if executed, the received commands would result in the remote cyber-physical system, $R_Y$ 102Y being configured in a prohibited, undesirable, and/or faulty state. If a received command destined for the remote cyber-physical system, $R_Y$ 102Y would not result in that system being configured in such a state, then the command monitor 306 issues the command to the remote cyber-physical system, $R_Y$ 102Y where the command is executed. Otherwise, if the command monitor 306 determines that the received command, if executed, would result in the remote cyber-physical system, $R_Y$ 102Y being configured in such a state, the command monitor 306 does not issue the received to command to the remote cyber-physical system, $R_Y$ 102Y, thereby preventing that command from executing and configuring the remote cyber-physical system, $R_Y$ 102Y into a prohibited, undesirable, and/or faulty state.

In some examples, the command monitor 106 provides feedback to the control stations, $C_Y$ 104Y over control feedback links 111Y. The feedback provided to the control stations, $C_Y$ 104Y includes but is not limited to information indicating whether commands issued by the control stations, $C_Y$ 104Y were issued to the remote cyber-physical system, $R_Y$ 102Y and information related to an updated state of the remote cyber-physical system, $R_Y$ 102Y.

Figure 4:
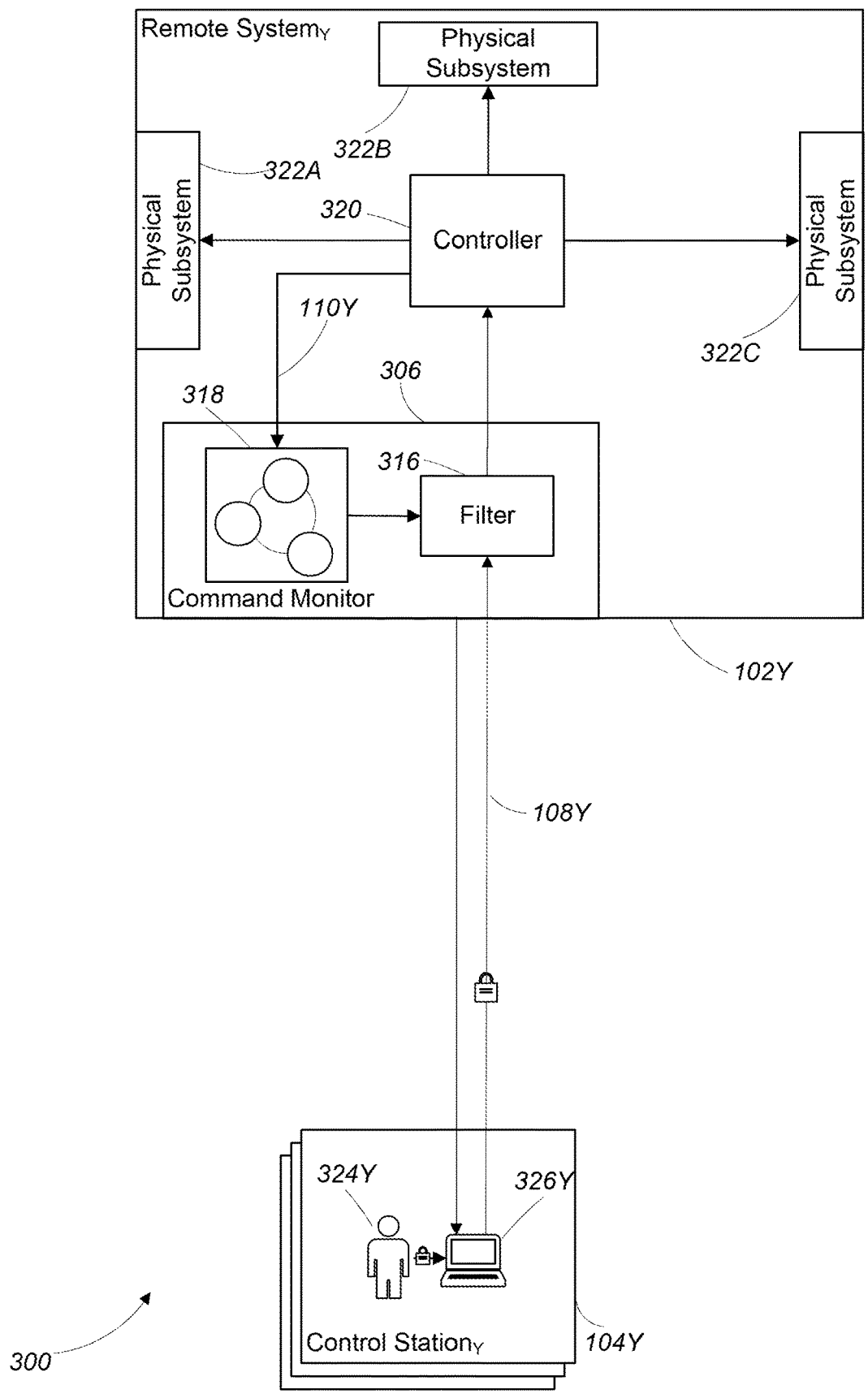
FIG. 4 is a detailed view of the communication and control system of FIG. 3.

Referring to FIG. 4, the remote cyber-physical system, $R_Y$ 102Y includes a controller 320 and a number of physical subsystems 322 including a first physical subsystem 322A, a second physical subsystem 322B, and a third physical subsystem 322C. Very generally, the controller 320 receives commands from the command monitor 306 and executes the commands, at least some of which would affect a change in one or more of the physical subsystems 322 when executed by the physical subsystem. The controller 320 provides state feedback directly to the command monitor 306 to inform the command monitor 306 of the current state of the remote cyber-physical system, $R_Y$ 102Y, including a current state of the physical subsystems 322 of the remote cyber-physical system, $R_Y$ 102Y.

The command monitor 306 includes a state predictor 318 (e.g., a state machine or a functional/simulation model of the remote cyber-physical system, sometimes referred to as a ground-side model) and a command filter 316. The state predictor 318 receives and maintains the updated state of the remote cyber-physical system, $R_Y$ 102Y from the controller 320. With the updated state reflected in the state predictor 318, the state predictor 318 is configured to predict a state of the remote cyber-physical system, $R_Y$ 102Y that would result from executing one or more commands at the remote cyber-physical system, $R_Y$ 102Y.

The command filter 316 is configured to receive commands directed to the remote cyber-physical system, $R_Y$ 102Y and to determine whether to pass the received commands to the remote cyber-physical system, $R_Y$ 102Y based, at least in part, on a predicted state of the remote cyber-physical system, $R_Y$ 102Y that would result from executing the received commands at the remote cyber-physical system, $R_Y$ 102Y. For example, when the command filter 316 receives one or more commands directed to the remote cyber-physical system, $R_Y$ 102Y, it causes the state predictor 318 to determine a predicted state that would result from executing the one or more commands at the remote cyber-physical system, $R_Y$ 102Y. The command filter 316 then filters the commands according to a command policy to determine whether the one or more commands are passed to the remote cyber-physical system, $R_Y$ 102Y.

As was the case in the many-to-many communication and control system described above, in some examples, the command policy is expressed using an access control model (e.g., the Attribute-Based Access Control (ABAC) model). The access control model includes access control rules that can be applied to state data (including system attributes) associated with one or both of the remote cyber-physical system, $R_Y$ 102Y and the control stations, $C_Y$ 104Y.

Each of the control stations, $C_Y$ 104Y includes an operator 324Y interacting with a control terminal 326Y to formulate and issue commands for controlling the remote cyber-physical system, $R_Y$ 102Y. In this example, the operator 324Y is an authorized user of the control terminal 326A and the control terminal 326Y has established (or is able to establish) a trust relationship with the command monitor 106.

The principle of operation for the communication and control system 300 of FIGS. 3 and 4 is substantially similar to that of the communication and control system 100 of FIGS. 1 and 2 in that the command monitor receives and mediates commands (e.g., all commands) that are issued over the communication links 108Y by the control stations, $C_Y$ 104Y and processes the received commands according to the current state of the remote cyber-physical system, $R_Y$ 102Y and the state information from the control stations, $C_Y$ 104Y to determine whether, if executed, the received commands would result in the remote cyber-physical system, $R_Y$ 102Y being configured in a prohibited, undesirable, and/or faulty state. But, one difference in the communication and control system 300 is that, by co-locating the command monitor 306 with the remote cyber-physical system, $R_Y$ 102Y, state information for the remote cyber-physical system, $R_Y$ 102Y is always available to the command monitor 306. One advantage of always having access to state information is that, certain remote cyber-physical systems (e.g., satellites) are only in contact with control stations for short periods of time. Having the command monitor co-located on the remote cyber-physical system obviates the need to send state information over a communication link (e.g., a radio link) to a remote command station.

3 One-to-Many Communication and Control System

Figure 5:
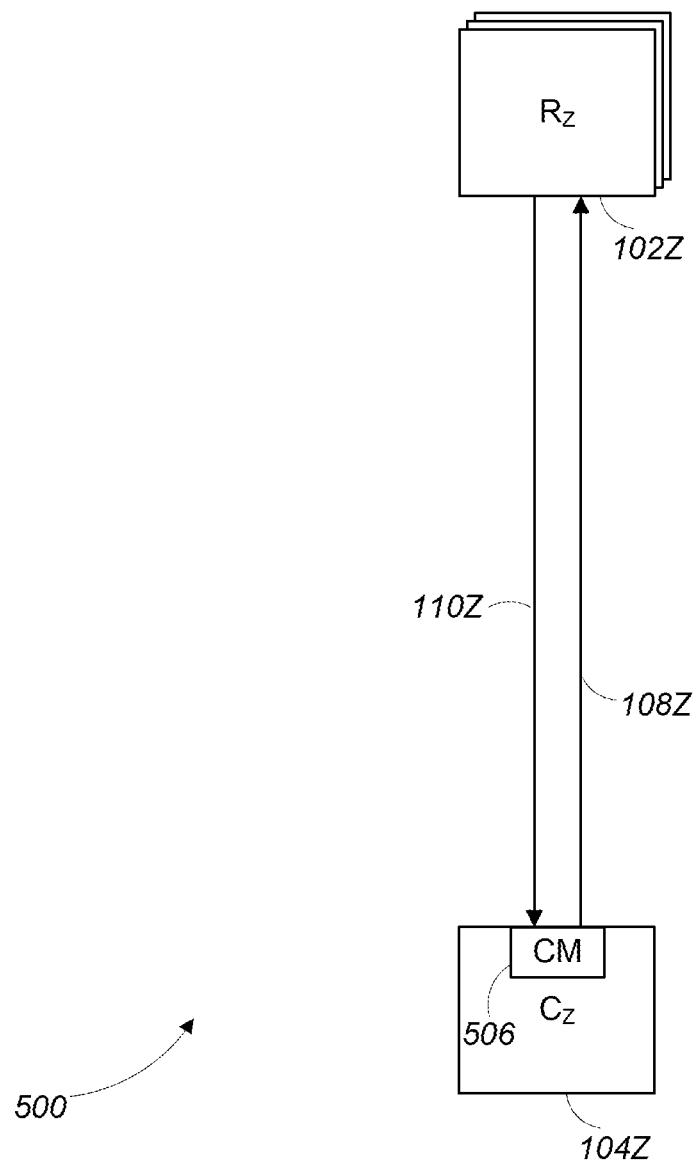
FIG. 5 is a third configuration of a communication and control system including a command monitor.

Referring to FIG. 5, a communication and control system 500 is configured as a "one-to-many" system, where a single control station, $C_Z$ 104Z issues commands to a number of remote cyber-physical systems, collectively referred to as $R_Z$ 102Z. The control station, $C_Z$ 104Z issues commands to the remote cyber-physical systems, $R_Z$ 102Z over one or more communication links 108Z.

A command monitor 506 is implemented at one end of the one or more communication links 108Z and on the control station, $C_Z$ 104Z. The command monitor 506 receives any commands that are issued by the control station, $C_Z$ 104Z before they leave the control station, $C_Z$ 104Z. The command monitor 506 also receives feedback from the remote cyber-physical systems, $R_Z$ 102Z over a state feedback link 110Z. The feedback indicates, among other information, a current state of the remote cyber-physical systems, $R_Z$ 102Z. The command monitor 506 processes the received commands according to the current state of the remote cyber-physical systems, $R_Z$ 102Z to which the commands are directed to determine whether, if executed, the received commands would result in one or more of the remote cyber-physical systems, $R_Z$ 102Z being configured in a prohibited, undesirable, and/or faulty state. If a received command destined for one or more of the remote cyber-physical systems, $R_Z$ 102Z would not result in those systems being configured in such a state, then the command monitor 506 issues the command to the one or more remote cyber-physical systems, $R_Z$ 102Z, where the command is executed. Otherwise, if the command monitor 506 determines that the received command, if executed, would result in the one or more remote cyber-physical systems, $R_Z$ 102Z being configured in such a state, the command monitor 506 does not issue the received to command to the remote cyber-physical systems, $R_Z$ 102Z, thereby preventing the received command from executing and configuring the remote cyber-physical systems, $R_Z$ 102Z into a prohibited, undesirable, and/or faulty state.

In some examples, because the command monitor 506 is implemented on the control station, $C_Z$ 104Z, it provides feedback directly to the control station, $C_Z$ 104Z. The feedback provided to the control station, $C_Z$ 104Z includes but is not limited to information indicating whether commands issued by the control station, $C_Z$ 104Z were issued to the remote cyber-physical systems, $R_Z$ 102Z and information related to the updated state of the remote cyber-physical systems, $R_Z$ 102Z.

Figure 6:
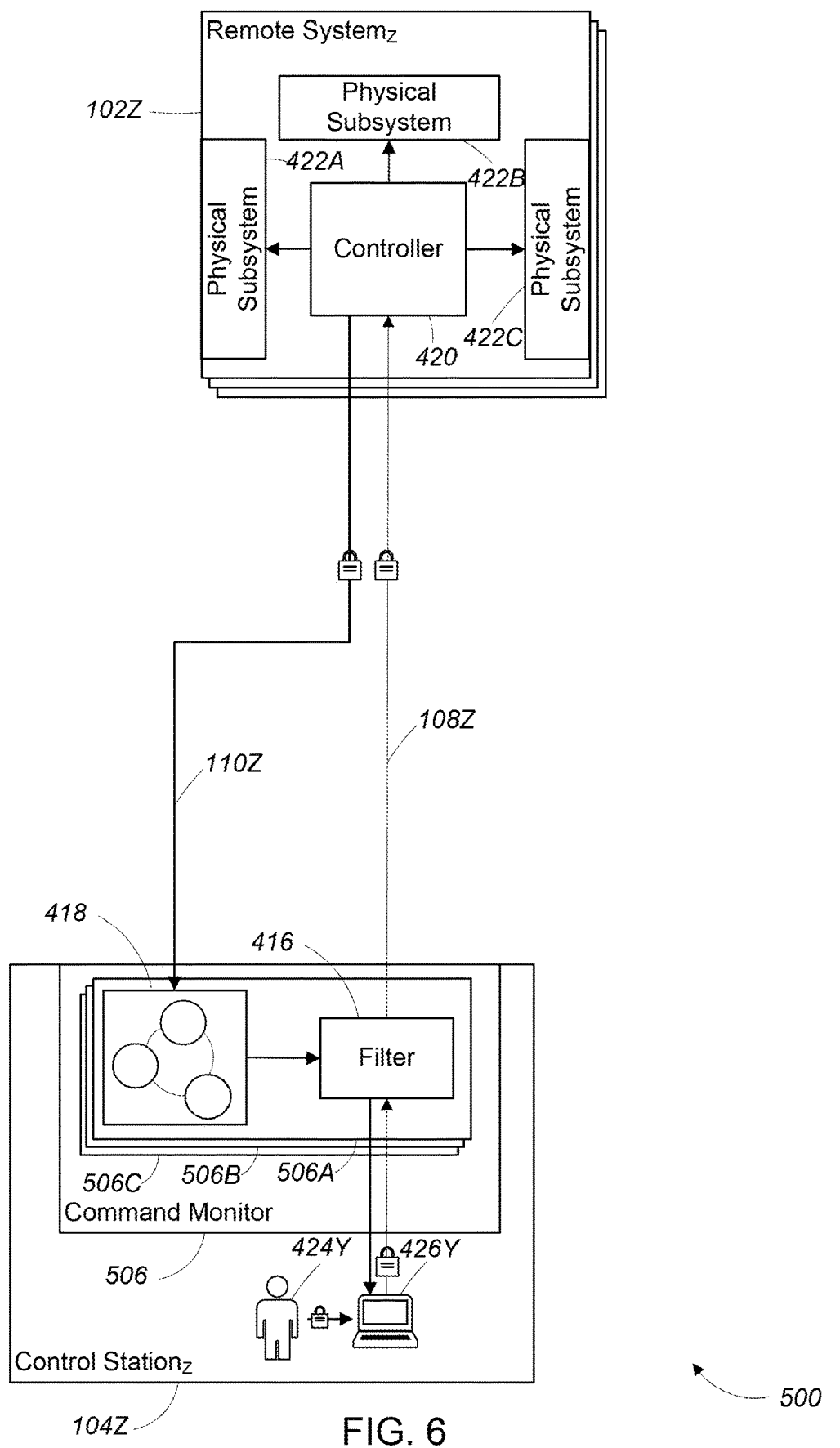
FIG. 6 is a detailed view of the communication and control system of FIG. 5.

Referring to FIG. 6, each of the remote cyber-physical systems, $R_Z$ 102Z includes a controller 420 and a number of physical subsystems 422. For example, the illustrated remote cyber-physical system includes a first physical subsystem 422A, a second physical subsystem 422B, and a third physical subsystem 422C. Very generally, the controller 420 receives commands from the command monitor 506 and executes the commands, at least some of which would affect a change in one or more of the physical subsystems 422 when executed by the physical subsystem. The controller 420 provides state feedback to the command monitor 506 via the state feedback link 110Z to inform the command monitor 506 of the current state of the remote cyber-physical systems, $R_Z$ 102Z, including a current state of the physical subsystems 422 of the remote cyber-physical systems, $R_Z$ 102Z.

In some examples, the command monitor 506 includes a separate command sub-monitor 506A-C for each of the remote cyber-physical systems 102 that it monitors. For example, the command monitor 506 in FIG. 6 includes a first command sub-monitor 506A, a second command sub-monitor 506B, and a third command sub-monitor 506C, each associated with a different one of the remote cyber-physical systems, $R_Z$ 102Z. In other examples, a single command monitor 506 (with a single command sub-monitor) is used to monitor commands for multiple or all of the remote cyber-physical systems, $R_Z$ 102Z.

The first command sub-monitor 506A includes a state predictor 418 (e.g., a state machine or a functional/simulation model of the remote cyber-physical system, sometimes referred to as a ground-side model) and a command filter 416. The state predictor 418 receives and maintains the updated state of one of the remote cyber-physical systems, $R_Z$ 102Z from the controller 420. With the updated state reflected in the state predictor 418, the state predictor 418 is configured to predict a state of one of the remote cyber-physical systems, $R_Z$ 102Z that would result from executing one or more commands at the remote cyber-physical system.

The command filter 416 is configured to receive commands directed to one of the remote cyber-physical systems, $R_Z$ 102Z and to determine whether to pass the received commands to that remote cyber-physical system based, at least in part, on a predicted state of the remote cyber-physical system that would result from executing the received commands at the remote cyber-physical system. For example, when the command filter 416 receives one or more commands directed to one of the remote cyber-physical systems, $R_Z$ 102Z, it causes the state predictor 418 to determine a predicted state that would result from executing the one or more commands at the remote cyber-physical system. The command filter 416 then filters the commands according to a command policy to determine whether the one or more commands are passed to the remote cyber-physical system.

As was the case in the many-to-many communication and control system described above, in some examples, the command policy is expressed using an access control model (e.g., the Attribute-Based Access Control (ABAC) model). The access control model includes access control rules that can be applied to state data (including system attributes) associated with one or both of the remote cyber-physical systems, $R_Z$ 102Z and the control station, $C_Z$ 104Z.

The control station, $C_Z$ 104Z includes an operator 424Y interacting with a control terminal 426Y to formulate and issue commands for controlling the remote cyber-physical systems, $R_Z$ 102Z. In this example, the operator 424Y is an authorized user of the control terminal 426A and the control terminal 426Y has established (or is able to establish) a trust relationship with the command monitor 506.

The principle of operation for the communication and control system 500 of FIGS. 5 and 6 is substantially similar to that of the communication and control system 100 of FIGS. 1 and 2 in that the command monitor receives any commands that are issued over the communication links 108Z by the control station, $C_Z$ 104Z and processes the received commands according to the current state of the remote cyber-physical systems, $R_Y$ 102Z and the state information from the control station, $C_Z$ 104Z to determine whether, if executed, the received commands would result in the remote cyber-physical system $R_Y$ 102Z being configured in a prohibited, undesirable, and/or faulty state.

4 Alternatives

In some examples, the state of the remote cyber-physical data includes system attributes including but not limited to a spatial orientation of the system, a velocity of the system, an acceleration of the system, a momentum of the vehicle, resource levels of the system (e.g., fuel levels, battery levels, ordnance levels), attributes related to an environment in which the system is operating (e.g., temperature, humidity, barometric pressure, wind speed) and attributes of subsystems (e.g., physical subsystems) of the system (e.g., an orientation of a camera or a robotic arm). Examples of the state of the control stations include, but are not limited to a patch state, a network connectivity status, an authentication status of the control station, and authentication status, privilege level, or organization role of an operator associated with a control station.

In some examples, a single command monitor is used to receive and filter commands for multiple remote systems (e.g., a swarm of drones or a swarm of satellites). For example, as satellite deployment models switch from monolithic to constellation-based, unifying command interfaces with validation and security protections will be necessary. This is true for other types of remote cyber-physical systems (e.g., UAVs and other autonomous vehicles and remote sensors such as underwater monitors) as well, which are increasingly being deployed as swarms rather than individual units.

In some examples, the command monitor is configured to filter commands with a granularity of a single command. In other examples, the command monitor filters batches of commands, where any command in the batch of commands that violates the command monitor's command policy results in the entire batch being filtered (i.e., not sent to the remote cyber-physical system.

In some examples, the communication links are satellite links, network links, radio frequency links, or any other suitable communication link. Furthermore, certain communication links are hybrid and include one or more different types of links. For example, a communication link may have a network leg and a radio frequency leg.

In some examples, the command monitor enforces various types of rules using attributes received as state information from the remote cyber-physical systems and the control stations. While the examples of rules are essentially limitless, some rules prevent commands that would deplete fuel, restrict certain commands to highly privileged operators using secure terminals, or prevent operators from instructing systems to navigate outside of a geo-fence. In other examples, the rules control whether a package can be delivered by an autonomous vehicle based on attributes such as location and time. In some examples, the rules control user access to video feeds or other sensor data on the remote cyber-physical system. In some examples, the rules control user access to weapons systems. For example, the rules may allow or prevent a user from firing a missile when in a particular geographic region.

The command monitors can be deployed as software on an individual remote system, in which case it would mediate only commands issued to that system. They can also be deployed independently (or as part of the control station) to serve many systems.

In some examples, the command monitor is configured to track an inferred state of the remote cyber-physical system.

In some examples, the communication links between the command monitor and the remote cyber-physical systems are encrypted (e.g., using a symmetric encryption scheme). In some examples, the communication links between the control stations and the command monitor are encrypted (e.g., using a symmetric encryption scheme).

In some examples the trust relationship between the control stations and the command monitor is established using a mutual authentication scheme. In some examples, the authentication scheme includes user-level authentication.

In some examples, a trust relationship between the command monitor and the remote cyber-physical systems is established using a mutual authentication scheme.

In some examples, attributes of physical subsystems include but are not limited to battery life, fuel reserves, munitions levels, a state of imaging devices, a state of rocket boosters, a state of solar panels, a state of engines, a state of motors, a state of a steering apparatus, a state of wing flaps, navigation systems, and any other physical systems that are remotely controllable.

Some examples of remote cyber-physical systems that can benefit from the use of the command monitor include, but are not limited to satellites, unmanned vehicles (e.g., autonomous cars, unmanned aerial vehicles, unmanned underwater vehicles, unmanned space vehicles), industrial systems (e.g., remotely controlled nuclear plants or other power plants), and distributed power systems (e.g., a power grid).

In some examples, remote cyber-physical systems such as automobiles receive commands (e.g., a command to update software in the automobile or a command to disable a vehicle before it can flee a scene of a crime) over an encrypted link. The command monitor described herein can be used in addition to or instead of the encrypted link to provide additional flexibility and functionality to such systems.

In some examples, a digital and physical state of the remote cyber-physical system is modeled using an appropriate modeling technique. For examples, a model of the remote cyber-physical system can be encoded using a state-machine with a finite number of well-defined states, or a neural network or another suitable machine learning technique where weights are used to encode a condition or state of the system.

In some examples, state information for the remote cyber-physical system is received from sources other than the remote cyber-physical system. For examples, telescopic imaging of a satellite can be used to determine a position and motion of a satellite. That additional state information can be compared to state information received from the remote cyber-physical system.

Certain examples of remote cyber-physical systems such as satellites may only be able to communicate with control stations for short periods of time. For example, a satellite may only be able to communicate with a control station for 5 minutes out of every 90 minutes. In such situations, the control station uses the 5-minute window of communication to send a batch of commands for the satellite to execute while the satellite is out of communication range with the control station. This particular situation is especially prone to the satellite being configured in a prohibited, undesirable, and/or faulty state because a potentially large number of commands that may interact with the satellite and the other commands in unexpected ways are sent to the satellite in a short amount of time. The command monitor ensures that the commands do not configure the satellite in a prohibited, undesirable, and/or faulty state.

In some examples, a trust relationship is required for all communications between the control stations and the command monitor. In other examples, only communications issued from the control stations to the command monitor require a trust relationship. In yet other examples, only communications issued from the command monitor to the control stations require a trust relationship.

In some examples, a trust relationship is required for all communications between the command monitor and the remote cyber-physical systems. In other examples, only communications issued from the command monitor to the remote cyber-physical systems require a trust relationship. In yet other examples, only communications issued from the remote cyber-physical system to the command monitor require a trust relationship.

In some examples, establishing the trust relationship includes mutually authenticating two or more of the command monitor, the control station, and the remote system. For example, both the control station and the remote system are mutually authenticated with the command monitor. In some examples, users at one or more of the command monitor, the control station, and the remote system are mutually authenticated with one or more of those components. Establishing mutual authentication may include using one or more of pre-shared keys, a public key infrastructure, and quantum key distribution or any other suitable mutual authentication scheme.

In some examples, information about authenticated users and/or components can be included as input to the command monitor, where the input is taken into consideration when determining if it is permissible to cause a predicted set of one or more outcomes that would result from execution of the one or more commands at the remote system.

5 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data recordings; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method for mediating an interaction between a control station and a remote system using a command monitor located on a communication path between the control station and the remote system, the method comprising:

maintaining, at the command monitor, data characterizing an operation of the remote system in response to execution of one or more commands at the remote system;

receiving, at the command monitor, state information from the remote system;

updating the data characterizing the operation of the remote system based on the received state information;

receiving, at the command monitor, one or more commands issued from the control station, the one or more commands including at least one command whose further issuance from the command monitor to the remote system would cause the remote system to execute an operation at a future time that the control station is unable to communicate with the remote system;

determining a predicted set of one or more outcomes that would result from execution of the one or more commands at the remote system based at least in part on the data characterizing the operation of the remote system; and preventing further issuance of at least one command of the one or more commands from the command monitor to the remote system based on the predicted set of one or more outcomes.

2. The method of claim 1 wherein maintaining the data characterizing an operation of the remote system includes maintaining state information for the remote system and maintaining an operational model of the remote system.

3. The method of claim 2 further comprising determining the operational model of the remote system, including modeling a physical and logical state of the remote system.

4. The method of claim 2 wherein the operational model of the remote system comprises a physical model of the remote system.

5. The method of claim 2 wherein receiving the state information from the remote system includes receiving one or more state variables from the remote system, and updating the data characterizing the operation of the remote system includes updating the state information of the data characterizing an operation of the remote system using the received state information.

6. The method of claim 2 wherein determining the predicted set of one or more outcomes includes simulating operation of the remote system executing the one or more commands using the operational model of the remote system and the state information for the remote system.

7. The method of claim 1 wherein preventing issuance of the at least one command of the one or more commands includes determining that at least some of the predicted set of one or more outcomes violates a permitted operating state of the remote system.

8. The method of claim 1 wherein the command monitor is implemented on a computing device separate from the control station and the remote system.

9. The method of claim 1 wherein the command monitor is implemented at the remote system.

10. The method of claim 1 wherein the command monitor is implemented at the control station.

11. The method of claim 1 further comprising receiving, at the command monitor, one or more attributes associated with the control station from the control station, wherein preventing issuance of at least one command of the one or more commands to the remote system is further based on the one or more attributes associated with the control station.

12. The method of claim 11 wherein preventing issuance of at least one command of the one or more commands to the remote system includes determining that the at least one command would cause the remote system to enter a prohibited state.

13. The method of claim 11 wherein preventing issuance of at least one command of the one or more commands to the remote system includes applying a set of one or more rules to the one or more attributes and determining, based on the applying, to prevent issuance of the one or more commands to the remote system.

14. The method of claim 1 further comprising receiving second state information from the control station, wherein determining the predicted set of one or more outcomes that would result from execution of the one or more commands at the remote system is further based on the second state information.

15. The method of claim 1 wherein the remote system includes a satellite.

16. The method of claim 1 wherein the remote system includes an unmanned vehicle.

17. The method of claim 1 wherein the remote system includes an industrial control system.

18. The method of claim 1 wherein the state information includes one or more of a battery level, a fuel level, a position, an orientation, information characterizing a motion of the remote system, and a physical configuration of the remote system including a configuration of a camera, a configuration of a power source, or a configuration of telemetry hardware, a bearing of the remote system, a heading of the remote system, a delivery status of a package, a power output of the remote system, environmental information, temperature information, humidity information, wind speed information, road condition information, weather information, photographic information, and video information.

19. The method of claim 18 wherein the state information includes two or more of a battery level, a fuel level, a position, an orientation, information characterizing a motion of the remote system, and a physical configuration of the remote system including a configuration of a camera, a configuration of a power source, or a configuration of telemetry hardware, a bearing of the remote system, a heading of the remote system, a delivery status of a package, a power output of the remote system, environmental information, temperature information, humidity information, wind speed information, road condition information, weather information, photographic information, and video information.

20. The method of claim 1 further comprising receiving, at the command monitor, second state information characterizing a state of the remote system, the second state information obtained from a sensor independent from the remote system.

21. The method of claim 1 further comprising mutually authenticating two or more of the command monitor, the control station, and the remote system.

22. The method of claim 21 wherein the mutual authenticating includes using one or more of pre-shared keys, a public key infrastructure, and quantum key distribution.

23. The method of claim 1 further comprising mutually authenticating one or more users at one or more of the command monitor, the control station, and the remote system.

24. The method of claim 23 wherein the mutual authenticating includes using one or more of pre-shared keys, a public key infrastructure, and quantum key distribution.

25. The method of claim 1 wherein one or more commands include commands for causing the remote system to perform sequence of operations.

26. The method of claim 1 wherein determining a predicted set of one or more outcomes includes predicting that execution of the one or more commands while the control station is unable to communication with the remote system would result in at least one or both of resources being exhausted and causing the remote system to enter an incorrect navigational state.

27. A system for mediating an interaction between a control station and a remote system, the system comprising
a command monitor located on a communication path between the control station and the remote system, the command monitor comprising,
a first input for receiving state information from the remote system;
a second input for receiving one or more commands sent from the control station, the one or more commands including at least one command whose further issuance from the command monitor to the remote system would cause the remote system to execute an operation at a future time that the control station is unable to communicate with the remote system;
a state predictor including data characterizing an operation of the remote system in response to execution of one or more commands at the remote system, the state predictor configured to determine a predicted set of one or more outcomes that would result from execution of the one or more commands at the remote system based at least in part on the data characterizing the operation of the remote system;
a command filter for processing the one or more commands sent from the control station according to the predicted set of one or more outcomes determined by the state predictor, the processing including preventing further issuance of at least one command of the one or more commands from the command monitor to the remote system based on the predicted set of one or more outcomes.

* * * * *